(12) United States Patent
Zhang (10) Patent No.: US 11,178,450 B2
(45) Date of Patent: Nov. 16, 2021

(54) IMAGE PROCESSING METHOD AND APPARATUS IN VIDEO LIVE STREAMING PROCESS, AND STORAGE MEDIUM

(71) Applicant: TENCENT TECHNOLOGY (SHENZHEN) COMPANY LIMITED, Guangdong (CN)

(72) Inventor: Zhi Dong Zhang, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 127 days.

(21) Appl. No.: 16/536,484

(22) Filed: Aug. 9, 2019

(65) Prior Publication Data

US 2019/0364333 A1    Nov. 28, 2019

Related U.S. Application Data

(63) Continuation of application No. PCT/CN2018/088397, filed on May 25, 2018.

(30) Foreign Application Priority Data

May 31, 2017  (CN) .................. 201710405153.8

(51) Int. Cl.
*H04H 60/32* (2008.01)
*H04N 21/44* (2011.01)
(Continued)

(52) U.S. Cl.
CPC ..... *H04N 21/44008* (2013.01); *A63F 13/355* (2014.09); *A63F 13/86* (2014.09); *H04N 21/2187* (2013.01); *H04N 21/442* (2013.01)

(58) Field of Classification Search
CPC ......... H04N 21/44008; H04N 21/2187; H04N 21/442; H04N 21/6587; H04N 21/8153;
(Continued)

(56) References Cited

U.S. PATENT DOCUMENTS 9,733,896 B2 *  8/2017  Yamane ................. G06F 3/167
9,919,216 B2 *  3/2018  Odagiri ................ A63F 13/537
(Continued)

FOREIGN PATENT DOCUMENTS

CN     105009599 A     10/2015
CN     105363201 A     3/2016
(Continued)

OTHER PUBLICATIONS

International Search Report for PCT/CN2018/088397 dated, Aug. 17, 2018 (PCT/ISA/210).

*Primary Examiner* — James R Sheleheda
*Assistant Examiner* — Sahar Aqil Riaz
(74) *Attorney, Agent, or Firm* — Sughrue Mion, PLLC (57) ABSTRACT

A method and apparatus for video live streaming process are provided. The method may include obtaining a feature image preset for a service process, the feature image being an image block that identifies the service process, obtaining a video screenshot from a video live streaming data stream according to a screenshot interval, detecting whether the feature image exists in the video screenshot, and outputting the video screenshot based on the feature image being detected in the video screenshot.

20 Claims, 6 Drawing Sheets

(51) Int. Cl.
  *A63F 13/355* (2014.01)
  *A63F 13/86* (2014.01)
  *H04N 21/2187* (2011.01)
  *H04N 21/442* (2011.01)

(58) Field of Classification Search
  CPC ......... H04N 21/23418; H04N 21/4722; H04N 21/4781; H04N 21/435; A63F 13/355; A63F 13/86
  USPC .................................................. 725/19
  See application file for complete search history.

(56) References Cited

U.S. PATENT DOCUMENTS

| | | | | |
|---|---|---|---|---|
| 10,223,438 | B1* | 3/2019 | Xu | G06F 16/285 |
| 10,721,439 | B1* | 7/2020 | Pantofaru | G06K 9/3233 |
| 10,860,928 | B2* | 12/2020 | Mnih | G06N 3/0454 |
| 10,939,069 | B2* | 3/2021 | Guo | H04N 21/4333 |
| 2011/0312414 | A1* | 12/2011 | O'Donnell | G06Q 30/02 |
| | | | | 463/31 |
| 2012/0076357 | A1 | 3/2012 | Yamamoto et al. | |
| 2012/0185886 | A1* | 7/2012 | Charania | H04N 21/8173 |
| | | | | 725/2 |
| 2014/0179428 | A1* | 6/2014 | Miura | A63F 13/355 |
| | | | | 463/31 |
| 2015/0294433 | A1* | 10/2015 | Ye | G06F 3/0484 |
| | | | | 345/418 |
| 2015/0296250 | A1* | 10/2015 | Casper | G06Q 30/0623 |
| | | | | 725/34 |
| 2016/0057490 | A1* | 2/2016 | Besehanic | H04H 60/31 |
| | | | | 725/19 |
| 2016/0117061 | A1* | 4/2016 | Hodgart | G06T 1/0007 |
| | | | | 715/733 |
| 2016/0247537 | A1* | 8/2016 | Ricciardi | G11B 27/036 |
| 2017/0006328 | A1* | 1/2017 | Verticchio | H04N 21/2187 |
| 2017/0011264 | A1* | 1/2017 | Smolic | G11B 27/28 |
| 2017/0110151 | A1* | 4/2017 | Matias | G06K 9/00758 |
| 2017/0132468 | A1* | 5/2017 | Mosher | G06T 7/246 |
| 2017/0368460 | A1* | 12/2017 | Ceraldi | A63F 13/5258 |
| 2018/0018852 | A1* | 1/2018 | Riggs | A63F 13/22 |
| 2018/0043261 | A1 | 2/2018 | Lin et al. | |
| 2018/0129657 | A1* | 5/2018 | Guest | G06F 9/44 |
| 2018/0137201 | A1* | 5/2018 | Longbin | G06F 16/285 |
| 2018/0300050 | A1* | 10/2018 | Mulcahy | A63F 13/812 |
| 2018/0300557 | A1* | 10/2018 | Rodenas | G11B 27/10 |
| 2019/0124398 | A1* | 4/2019 | Qiang | H04N 21/4722 |
| 2020/0099960 | A1* | 3/2020 | Yu | H04N 21/4788 |

FOREIGN PATENT DOCUMENTS

| | | |
|---|---|---|
| CN | 106550249 A | 3/2017 |
| CN | 107241644 A | 10/2017 |

* cited by examiner

IMAGE PROCESSING METHOD AND APPARATUS IN VIDEO LIVE STREAMING PROCESS, AND STORAGE MEDIUM

CROSS-REFERENCE TO RELATED APPLICATIONS

This application is a continuation of International Patent Application No. PCT/CN2018/088397 filed on May 25, 2018, which claims priority from Chinese Patent Application No. 201710405153.8, filed in the Chinese Patent Office on May 31, 2017 and entitled "IMAGE PROCESSING METHOD AND APPARATUS IN VIDEO LIVE STREAMING PROCESS," the disclosures of which are incorporated herein by reference in their entireties.

BACKGROUND

1. Field

Embodiments of the present disclosure relate to the field of computer technologies, and in particular, to an image processing method and apparatus in a video live streaming process, and a storage medium.

2. Description of Related Art

Currently, the technology of game video live streaming is developing rapidly. The game video live streaming, such as multiplayer online battle arena (MOBA), is one of the most popular game video live streaming services. More players perform live streaming on their own game processes by using a related official competition event or video live streaming platform, and also more players learn game-related operations and technologies by watching these live streaming videos.

SUMMARY

According to an embodiment, an image processing method of a video live streaming process, the method may include obtaining a feature image preset for a service process, the feature image being an image block that identifies the service process; obtaining a video screenshot from a video live streaming data stream according to a screenshot interval; detecting whether the feature image exists in the video screenshot; and outputting the video screenshot based on the feature image being detected in the video screenshot.

According to another embodiment, an image processing apparatus of a video live streaming process may include at least one memory configured to store computer program code; and at least one processor configured to access the computer program code including feature obtaining code configured to cause the at least one processor to obtain a feature image preset for a service process, the feature image being an image block that identifies the service process; video screenshot code configured to cause the at least one processor to obtain a video screenshot from a video live streaming data stream according to a screenshot interval; feature detection code configured to cause the at least one processor to detect whether the feature image exists in the video screenshot; and image output code configured to cause the at least one processor to output the video screenshot based on the feature image being detected in the video screenshot.

According to another embodiment, an image processing method of a video live streaming process, performed by a terminal device, the method may include obtaining a feature image preset for a service process, the feature image being an image block identifies the service process; obtaining a video screenshot from a video live streaming data stream according to a screenshot interval; detecting whether the feature image exists in the video screenshot; and outputting the video screenshot based on the feature image being detected in the video screenshot.

BRIEF DESCRIPTION OF THE DRAWINGS

FIG. 2-$a$ is a screenshot of an application scenario of a video live streaming window according to an embodiment.

FIG. 2-$b$ is another screenshot of a video live streaming window cut from a live streaming interface shown in FIG. 2-$a$.

FIG. 3-$a$ is a screenshot of an application scenario of a feature image and a sample content image according to an embodiment.

FIG. 3-$b$ is a another screenshot of a feature image cut from the video screenshot shown in FIG. 3-$a$.

FIG. 3-$c$ is a another screenshot of a sample content image cut from the video screenshot shown in FIG. 3-$a$.

FIG. 4-$a$ is a screenshot of a display scenario in which process information is in a video live streaming window according to an embodiment.

FIG. 4-$b$ is a another screenshot of a video equipment image that is displayed in the video live streaming window shown in FIG. 4-$a$.

FIG. 5-$a$ is a composition schematic diagram of an image processing apparatus in a video live streaming process according to an embodiment.

FIG. 5-$b$ is a composition schematic diagram of a feature obtaining module of an image processing apparatus in a video live streaming process according to an embodiment.

FIG. 5-$c$ is a composition schematic diagram of a feature detection module of an image processing apparatus in a video live streaming process according to an embodiment.

FIG. 5-$d$ is a composition schematic diagram of an image processing apparatus in a video live streaming process according to an embodiment.

DESCRIPTION OF EMBODIMENTS

Embodiments of the present disclosure provide an image processing method and apparatus in a video live streaming process to automatically extract an image in the video live streaming process through image comparison, thereby reducing workload of operational staff.

To make the objectives, features, and advantages of the present disclosure clearer and more comprehensible, the following describes the technical solutions in the embodiments of the present disclosure with reference to the accompanying drawings. Apparently, the embodiments described herein are some rather than all of the embodiments of the present disclosure. All other embodiments obtained by persons skilled in the art based on the embodiments of the present disclosure shall fall within the protection scope of the present disclosure.

In the specification, claims, and the foregoing drawings of the present disclosure, the terms "include", "contain" and any other variants mean to cover the non-exclusive inclusion, so that a process, method, system, product, or device that includes a series of units is not necessarily limited to those units, but may include other units not expressly listed or inherent to such a process, method, product, or device.

Figure 1:
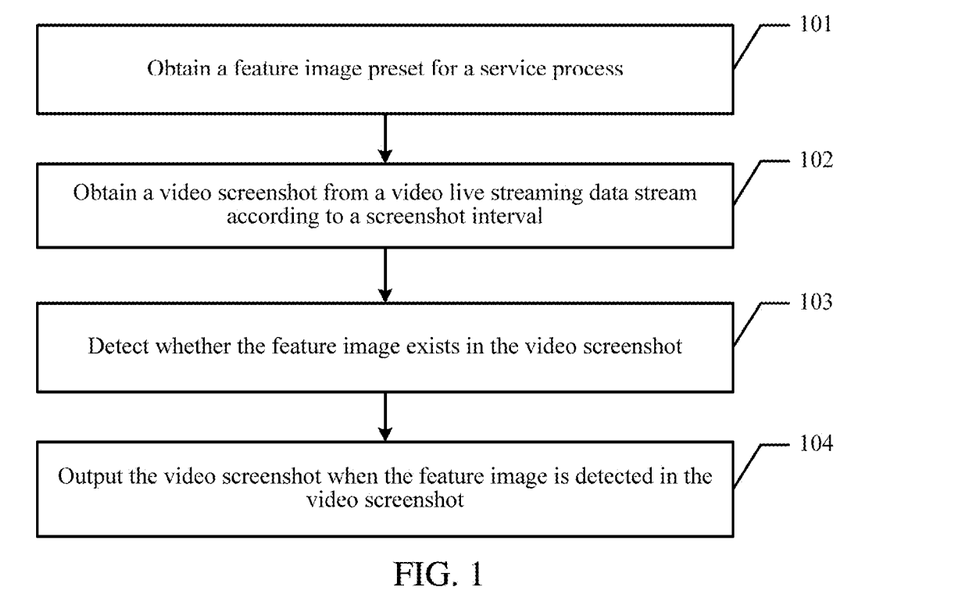
FIG. 1 is a flowchart of an image processing method in a video live streaming process according to an embodiment.

According to an embodiment, the image processing method in a video live streaming process may be used to automatically extract an image in the video live streaming process through image comparison on a video live streaming platform, so that the operational staff do not need to manually extract images and process information. For example, the video live streaming platform may be applied to game video live streaming and race event live streaming. Referring to FIG. 1, the image processing method in a video live streaming process includes the following steps.

In step 101, the method may obtain a feature image preset for a service process.

The service process is a video live streaming process that obtains process information. For example, the service process may be a game process. Specifically, the service process is a progress of the video live streaming, and for a live streaming viewing user of the video live streaming, the live streaming viewing user may have a service process to-be-watched customized on the video live streaming platform. The service process may be described by using an example. The service process may include a game process and may include a process in another application implementation scenario, such as office software. The service process may be implemented by using a process identifier. For example, the game process may include a start and an end of a game, fighting information in the game process, equipment information of an outfit. The equipment information of the outfit may be a specific outfit used by each of the two fighting characters in the game.

In this embodiment, the live streaming viewing user of the video live streaming may select the service process that needs to be watched, and after the service process is determined, obtain a feature image preset for the service process from the video live streaming platform according to the service process. The feature image is an image feature set that is used to identify the service process, and the feature image includes a video image of the service process. For example, the live streaming viewing user needs to watch equipment information of an outfit in a game scenario on the video live streaming platform, and may select, from the video live streaming platform, a game page containing the equipment information, as the feature image.

The step 101 of obtaining a feature image preset for a service process may further include the following. In sub-step A1, the method may obtain a sample screenshot corresponding to the service process, and In sub-step A2, the method may obtain the feature image preset for the service process from the sample screenshot, where the feature image includes a first location coordinate and first length and width information.

It may be understood that the sub-step A2 may also be expressed as obtaining, from the sample screenshot, the feature image preset for the service process and first attribute information corresponding to the feature image, the first attribute information including a first location coordinate and first length and width information. The first location coordinate is a location coordinate of the feature image in the sample screenshot, and the first length and width information is length and width information of the feature image.

The first attribute information corresponding to the feature image may be used to obtain a comparison image from the video screenshot, and pixel data of the feature image may be used for subsequent comparison with the comparison image, so as to determine whether the feature image and the comparison image are the same.

In sub-step A3, the method may obtain a sample content image from the sample screenshot, the sample content image including a second location coordinate and second length and width information.

It may be understood that the sub-step A3 may also be expressed as obtaining, from the sample screenshot, second attribute information corresponding to a sample content image, the second attribute information including a second location coordinate and second length and width information. The sample content image is an image block that is in the sample screenshot and that displays process information of the service process. The second location coordinate is a location coordinate of the sample content image in the sample screenshot, and the second length and width information is length and width information of the sample content image.

The second attribute information may be used to obtain a process content image in the video screenshot where the feature image exists.

After the service process that needs to be displayed in the video live streaming process is determined, the sample screenshot corresponding to the service process may be obtained first. For example, the sample screenshot may be obtained from a video live streaming window or a material library of a video live streaming application. For example, the video live streaming window may be displayed on a display interface of a video live streaming client, and a video image may be displayed in the video live streaming window. A corresponding page may be displayed in the video live streaming window for different video live streaming pages.

When a viewer determines that a specific process needs to be watched (for example, a specific service process), the viewer takes a screenshot on an image that displays the service process in the video live streaming window, so that the sample screenshot corresponding to the service process may be obtained. The sample screenshot may be obtained from the video live streaming window by taking a screenshot. Usually, before the video live streaming starts, the sample screenshot may be obtained first. Then, the feature image may be acquired from the obtained sample screenshot. For example, an image block that can identify the service process in a video process may be obtained from the sample screenshot and used as a feature image. That is, the feature image is an image block that can identify the service process. Further, the feature image of the service process may be a video image different from other processes. For example, the feature image may be a menu button in the sample screenshot, or a display frame which display location does not change in the video live streaming process. A location of the feature image in the video live streaming window may be identified as the first location coordinate, and length data and width data of the feature image may be identified as the first length and width information. The sample content image may be obtained from the sample screenshot. The sample content image indicates a location at which image content needs to be obtained and a specific area associated with the image content. A location of the sample content image in the video live streaming window may be identified as the second location coordinate, and the length data and the width data of the sample content image in the video live streaming window may be identified as the second length and width information.

For example, a service process that needs to be watched by the live streaming viewing user may be equipment information of an outfit. A part of an equipment image in the sample screenshot that is different from other images may be determined, and may be referred to as the feature image. As such, the following information may be stored. For example, an upper-left corner of the sample screenshot may be a coordinate origin (0, 0), a start coordinate of an upper-left corner of the feature image may be (x1, y1), and a width and a height of the feature image may be (w1, h1). Based on these information, the feature image may be obtained and stored. An equipment content image in a game may be found according to the sample screenshot and the following information may be recorded: a start coordinate of an upper-left corner of the equipment image (x2, y2), and the width and the height of the equipment image (w2, h2).

In step 102, the method may obtain a video screenshot from a video live streaming data stream according to a screenshot interval.

According to an embodiment, it may be assumed that a screenshot time interval is set to every 3 seconds, the video live streaming data stream played on the video live streaming platform is decoded, a current video live streaming screenshot is obtained every 3 seconds, and the video live streaming screenshot is referred to as the video screenshot. After the screenshot interval is set, a plurality of video screenshots may be obtained from the video live streaming data stream according to the screenshot interval. Each time the video screenshot is obtained, a detection procedure in step 103 may be performed.

The steps 101 and 102 do not have a temporal or logical sequence. For example, step 101 may be performed before step 102, or step 102 may be performed before step 101, or step 101 and step 102 may be performed simultaneously.

In step 103, the method may detect whether the feature image exists in the video screenshot.

According to an embodiment, after the video screenshot is obtained in step 102, an image analysis may be performed on the video screenshot to detect whether the feature image obtained in step 101 exists in the obtained video screenshot. That is, whether the feature image appears in the video screenshot. In addition, whether a feature of the feature image is located in the video screenshot may be detected. If the feature image is detected in the video screenshot, the method indicates that the currently obtained video screenshot includes process information of a service process. For example, if the service process is equipment information in a game scenario, and when the feature image that conforms to the service process appears on the currently obtained video screenshot, the method indicates that the equipment information that conforms to requirements of the live streaming viewing user appears in the video screenshot. If the feature image is not detected in the video screenshot, the method indicates that the currently obtained video screenshot does not include the process information of the service process.

According to an embodiment, the video live streaming data stream may be pushed to a user client through the video live streaming platform, and the user client may display the video live streaming data stream. In this embodiment, a video may be decoded according to the screenshot interval to obtain each frame, and each frame may be automatically detected by using an image comparison algorithm. As such, the video image may be obtained and a feature analysis of the image may be automatically performed without relying on the operational staff of the video live streaming platform, and therefore, accuracy and efficiency may be improved.

In some embodiments, step 103 of detecting whether the feature image exists in the video screenshot may further include the following.

In sub-step B1, the method may obtain a comparison image in the video screenshot according to the first location coordinate and the first length and width information, a location coordinate of the comparison image in the video screenshot being the first location coordinate, and length and width information of the comparison image in the video screenshot being the first length and width information.

In sub-step B2, the method may determine whether the comparison image and the feature image are the same based on the image comparison. If the comparison image and the feature image are the same, the method may further determine that the feature image is detected in the video screenshot, or if the comparison image and the feature image are different, determine that the feature image is not detected in the video screenshot.

After obtaining the video screenshot in step 102, the comparison image that conforms to the first location coordinate and the first length and width information is cut from the video screenshot. Here, a location and size of the comparison image in the video screenshot may be the same as that of the feature image. Then, whether the feature image and the comparison image are the same image can be compared by using an image comparison algorithm. For example, the image comparison algorithm that may be an AKAZF method of OpenCV.

In some embodiments, the image processing method in a video live streaming process provided in this embodiment may further include the following steps.

In step C1, the method, when the feature image is not detected in the obtained video screenshot and a next-time screenshot moment is reached, perform the step 102 of obtaining a video screenshot from a video live streaming data stream according to a screenshot interval.

It may be understood that the step C1 may be described as, if the feature image is not detected in the video screenshot and the screenshot interval reaches the next-time screenshot moment, perform the following step of obtaining the video screenshot from the video live streaming data stream according to the screenshot interval.

In step 103, whether the feature image exists in the video screenshot may be detected. In addition to step 103, the following step may be performed, if the feature image is not detected in the video screenshot, after this video live streaming screenshot processing procedure ends, waiting unit the next screenshot interval is reached and performing the step 102. A next frame of the video screenshot may be obtained by performing steps 102 through 104 again.

In step 104, the method may output, when the feature image is detected in the video screenshot, the video screenshot.

According to an embodiment, if the feature image is detected in the video screenshot, the method may indicate that the currently obtained video screenshot is a video image that conforms to a requirement of the service process, and then the video screenshot may be output. There may be many cases in which the video screenshot includes the feature image. For example, the video screenshot may be output to viewers of the video live streaming through a display screen, so that the viewers may obtain the progress of the service process in real time. As another example, the video screenshot may be output from a memory of a terminal, and stored as a process image corresponding to the service process to facilitate image content analysis and information extraction of the video screenshot.

For example, the process information that corresponds to the service process and that may be obtained from the video screenshot is output. For example, a game event and a corresponding time may be obtained from the video screenshot. It may be understood that, for different service processes that may be monitored, process information obtained from the video screenshot may be different. For example, the service process may include fighting information in a game process, and if a feature image of the fighting information is detected in the video screenshot, a fighting progress in the game process may be obtained from the video screenshot.

In some embodiments, the step 104 of outputting the video screenshot may include the following.

In step D1, the method may obtain a process content image corresponding to the service process, in the video screenshot according to the second location coordinate and the second length and width information, and output the process content image.

If the feature image is detected in the video screenshot, it indicates that the currently obtained video screenshot is a video image that conforms to a requirement of the service process. As shown in step A3, the location coordinates of the sample content image may be the second location coordinate, and the length data and width data of the sample content image may be the second length and width information. The process content image that conforms to the second location coordinate and the second length and width information may be obtained from the video screenshot, and the location and size of the process content image in the video screenshot is the same as that of the sample content. According to another embodiment, after the process content image is output, the process information corresponding to the service process may be obtained by analyzing the process content image. For example, if the service process is a start and an end of a game, a video live streaming start time and a video live streaming end time of the game video live streaming may be determined by analyzing the process content image.

In some embodiments of the present invention, after the step 104 of outputting the video screenshot, the method may further include the following steps.

In step E1, the method may obtain, from the video screenshot, process information corresponding to the service process.

In step E2, the method may display, in the video live streaming window, the process information corresponding to the service process.

After the video screenshot is output, an image content analysis to extract information may be performed on the video screenshot. For example, the process information, that corresponds to the service process and that may be obtained from the video screenshot, may be output. For example, a game event and a corresponding time may be obtained from the video screenshot. After the process information of the video screenshot is obtained, the process information corresponding to the service process may be displayed to the user through the video live streaming window.

In some embodiments, the step E2 of displaying, in the video live streaming window, process information corresponding to the service process may include the following steps.

In step E21, the method may receive a process invoking instruction sent by a user.

In step E22, the method may display the process information corresponding to the service process, in the video live streaming window according to the process invoking instruction.

For example, the user may deliver the process invoking instruction by using a video live streaming client, and then display the process information corresponding to the service process, in the video live streaming window according to the process invoking instruction, to automatically display the process information in real time according to the instruction of the user. In this way, the entire process may be performed without participation of the operational staff.

According to an embodiment, the feature image preset for the service process may be obtained, the video screenshot may be obtained from the video live streaming data stream according to the screenshot interval, whether the feature image exists in the video screenshot may be detected, and the video screenshot may be output when the feature image is detected in the video screenshot. In this embodiment, the video screenshot may be obtained by extracting the video live streaming data stream in real time, and the video screenshot may be output when the feature image of the service process is detected in the video screenshot. A video screenshot including the feature image may be obtained precisely, rapidly, and continuously by using an image recognition technology. Thus, operational staff do not need to perform the video live streaming process in real time, so the workload of the operational staff may be greatly reduced. An automated image extraction may be implemented in the video live streaming process through image comparison, so that a manual extraction process of the process information is avoided, and errors and delays of the process information are reduced.

To better understand and implement the foregoing solution of this embodiment, the following specifically describes the solutions by taking a corresponding application scenario as an example.

For example, the video live streaming platform may be specifically a game video live streaming platform, and a process that the live streaming viewing user needs to pay attention to is equipment information in a game process. Accordingly, a video screenshot may be obtained by performing video decoding on game video live streaming content, and then process information of the game process may be automatically obtained by using a corresponding intelligent image recognition technology, and the process information may be used in operation of the video live streaming. For example, an event may occur in the game process. Specifically, a hero used by a player may defeat another hero of another player, and the game may end. All these process information may be used in operation of the video live streaming. The process information of the game may include other information, and is not limited to, start and end of a game, fighting information in the game process, and equipment information of an outfit.

According an embodiment, the game video screenshot may be extracted in real time, and the process information of the game process may be obtained and reported precisely, rapidly, and continuously by using the intelligent image recognition technology, thereby reducing the operational costs of the operational staff and greatly improving speed and accuracy of the process information. The following describes an actual product application of this embodiment by using a game video live streaming as an example.

Figure 2A:
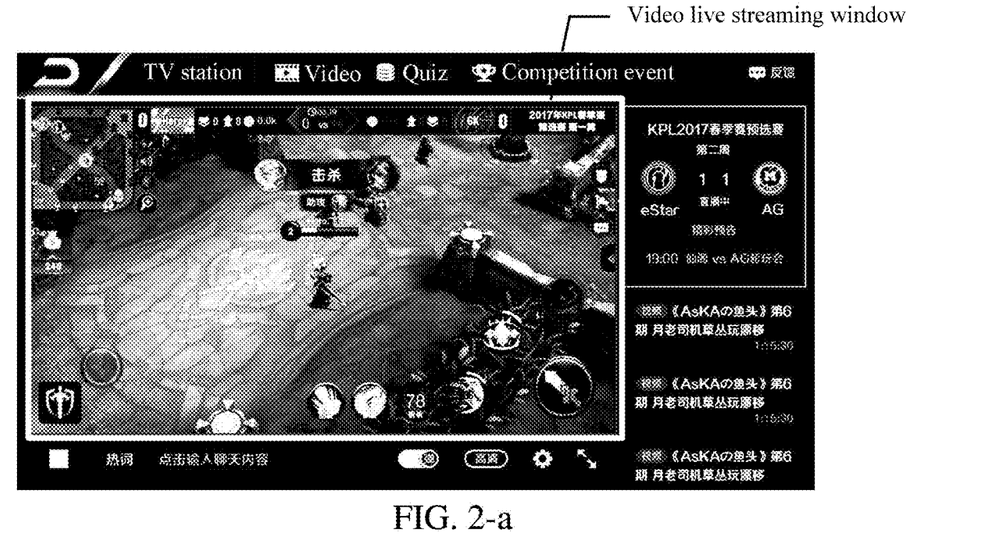
Figure 2B:
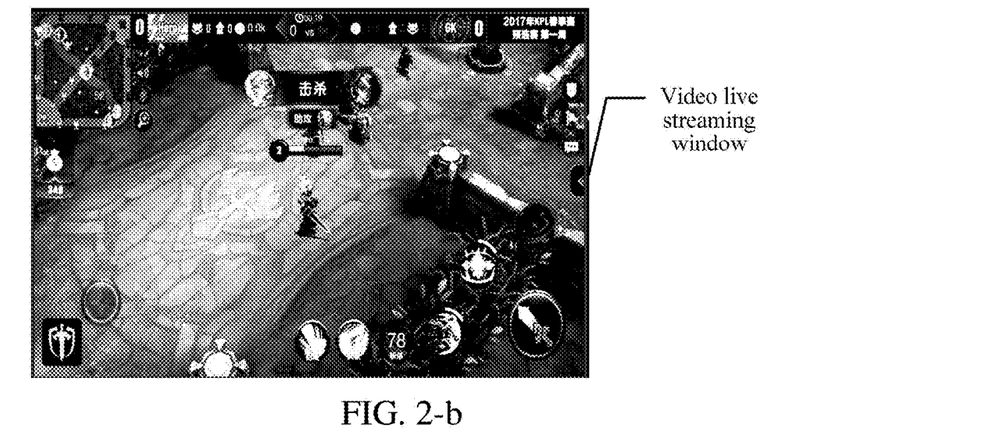

A live streaming interface in a game client in this embodiment is shown in FIG. 2-*a*. A window on the left side of the streaming interface may occupy a large part of the screen and may be the video live streaming window in a game scenario. That is, the window that is framed by a frame line between the upper menu including "TV station, Video, Quiz, and Competition event" and the bottom menu "hot word, bullet screen, and high definition" of the interface in FIG. 2-*a* is the video live streaming window. FIG. 2-*b* is a screenshot obtained by cutting the video live streaming window in the live streaming interface shown in FIG. 2-a. To resolve a requirement that viewing players actively watch the equipment information in real time, the technical solution provided in this embodiment may include the following processes.

Figure 3A:
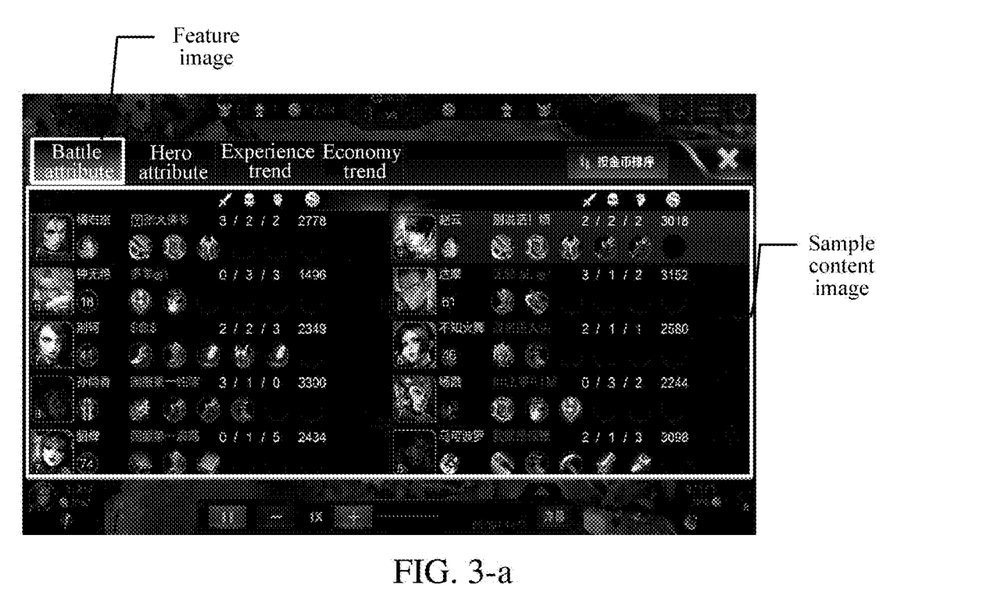

The step 1 may obtain a game screenshot of corresponding equipment information in a game before a competition event. As shown in FIG. 3-a, for ease of subsequent description, an upper frame line is added in the game screenshot. Based on the obtained game screenshot of corresponding equipment information, the following information may be stored, for example, a length and a width (w, h) of the game screenshot measured in pixels.

The step 2 may determine a part of an image different from the other images in the equipment image according to the game screenshot obtained before the competition event in step 1. For example, a "battle attribute" menu in FIG. 3-a may be referred to as a "feature image" herein, and the information on a start coordinate of the feature image at an upper-left corner, (x1, y1), and a width and a depth of the feature image, (w1, h1) may be stored. At the same time, the feature image is cut and stored. It should be noted that, an example in which the upper-left corner is a coordinate origin (0, 0) is used in subsequent embodiments, and without limitation, the bottom-left corner may also be selected as the coordinate origin.

Figure 3B:
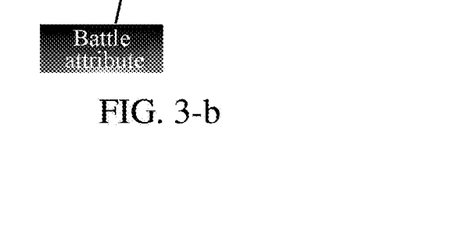

It should be noted that, the feature image used for intelligent recognition may be obtained in step 1 and step 2, and therefore, the feature image needs to be obtained before the competition event. Because some positions (for example, "battle attribute", "hero attribute", "experience trend" and "economy trend") in FIG. 3-a are fixed, so information on whether a real-time screenshot is an equipment image is determined by comparing a same location of the real-time screenshot in the game and the obtained feature image, and the determined result may be stored. For example, FIG. 3-b is another screen shot of the feature image cut in the video screenshot shown in FIG. 3-a, and an image block of "battle attribute" in FIG. 3-b is the feature image. In a live streaming process, equipment information of a character may be operated by the user in real time. The user operates to purchase or sell some outfits and a game system collects statistics on the equipment information and displays the equipment information.

Figure 3C:
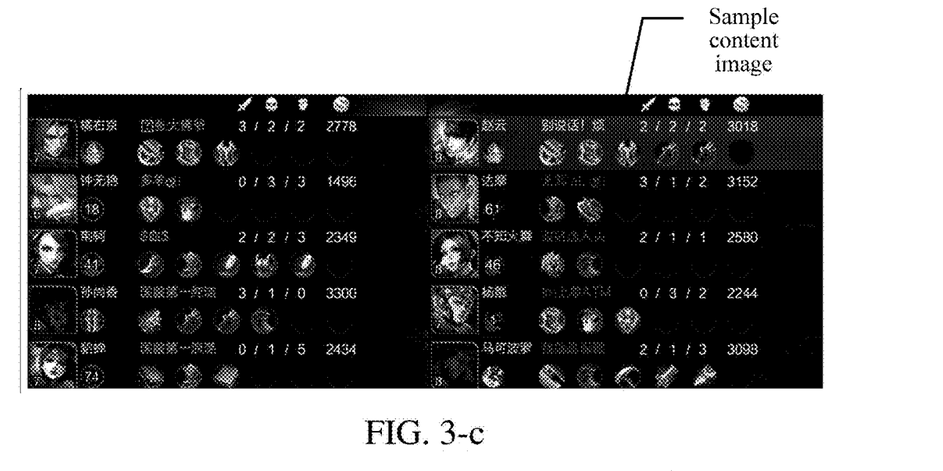

The step 3 may determine, according to the game screenshot, whether the equipment image in the game is needed in a game progress. FIG. 3-c is another screenshot of the sample content image obtained by cutting the frame line of the video screenshot shown in FIG. 3-a. The following information in FIG. 3-c may be recorded: a start coordinate of the equipment image at the upper-left corner (x2, y2), and a width and a height of the equipment image (w2, h2).

In step 4, after the game video live streaming has started, the operational staff may set a video parameter of the video live streaming stream so that the width and height are set as (w, h) in the step 1. After the game process starts, a game interface of the video live streaming stream may be switched by the operational staff on site to an equipment information image, and the equipment information image may be monitored. The operational staff do not need perform any other operations until the game ends.

In step 5, the method may set a screenshot time interval of the equipment information to, for example, every 3 seconds to decode the video live streaming stream, and obtain a live streaming screenshot of the current video every 3 seconds. After the live streaming screenshot is obtained, an image at the same location (that is, the upper-left coordinate (x1, y1) and the width and height (w1, h1)) of the video live streaming screenshot and the feature image in step 2 may be obtained. The image may be referred to as a comparison image. The feature image may be obtained before the game starts and the comparison image may be obtained in real time after the game starts.

In step 6, the method may compare the comparison image in step 5 and the feature image stored in step 2. The image comparison may use an AKAZE method of OpenCV. Determining whether the current video live streaming screenshot is a needed equipment information image may be determined according to a comparison result. If the comparison result returns that the comparison image and the feature image do not correspond to each other based on the set parameters, the live streaming screenshot processing procedure ends, and the step 5 may be performed again for the next live streaming screenshot.

In step 7, if the comparison result in step 6 returns that the comparison image and the feature image corresponds to each other based on the set parameters, it indicates that the needed equipment information image exists in the current live streaming screenshot. The image that is in the video live streaming screenshot and that is at the same location (that is, an upper-left coordinate (x2, y2) and a width and a height (w2, h2)) of the "equipment image" in step 3 may be obtained and stored, and the stored image is the needed "equipment information image."

Figure 4A:
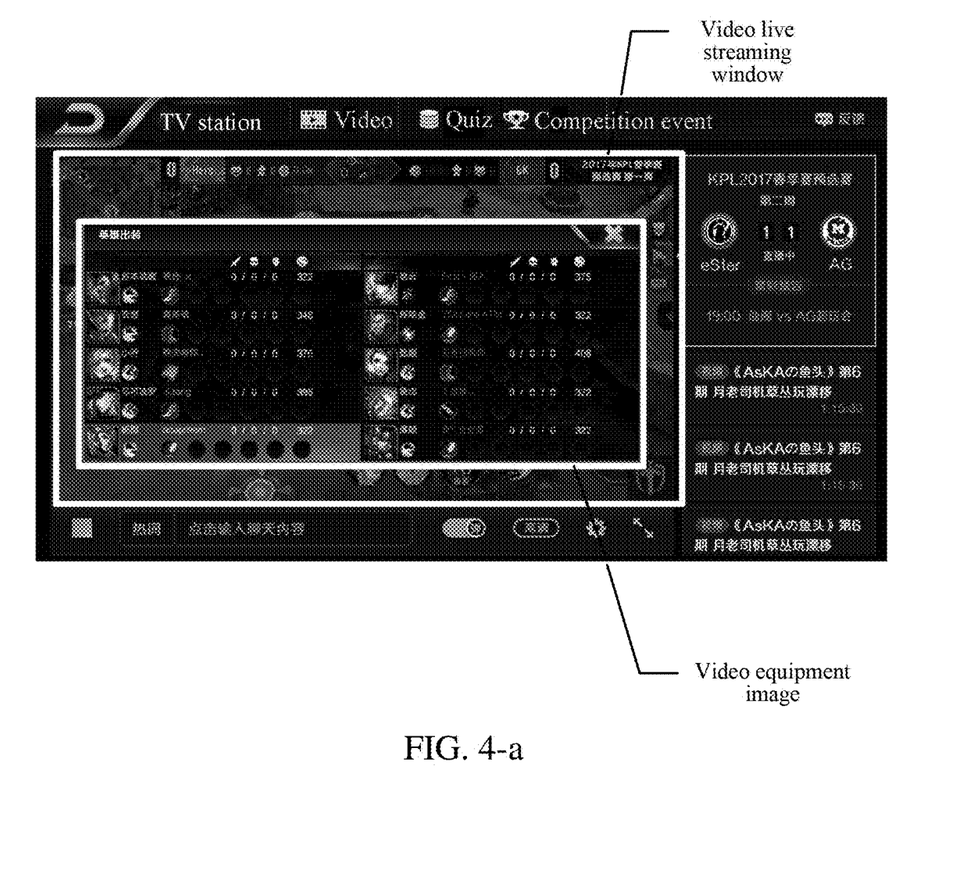
Figure 4B:
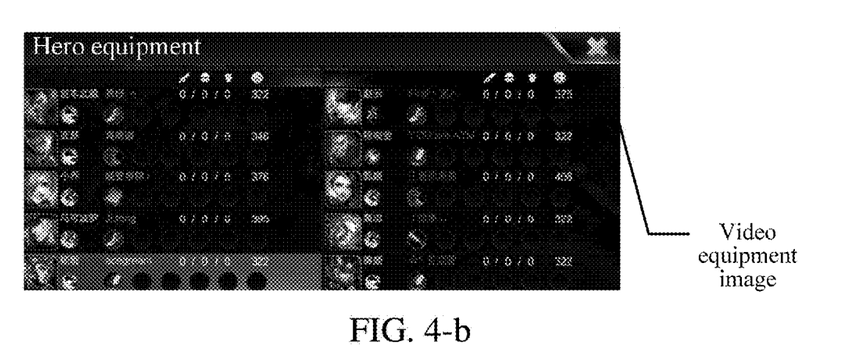

FIG. 4-a is a screenshot of a display scenario of process information in a video live streaming window according to this embodiment. FIG. 4-b is another screenshot of a video equipment image displayed in the video live streaming window shown in FIG. 4-a. Here, the viewers of a TV station may actively obtain equipment information of a player in a current game video live streaming process in real time by using an "equipment" button built in a user interface (UI) of the TV station.

Each equipment image in the live streaming process may be obtained through image comparison, and the equipment image may be stored. If the user clicks the equipment button, the equipment image may be displayed in real time to the user.

After implementing this technical solutions, the operational staff only needs to obtain the feature image and the video screenshot after the game live streaming starts, and do not need to pay attention to the game process in real time. Therefore, the workload of the operational staff is greatly reduced. At the same time, because the system intelligently determines the current video content in the game live streaming process according to this technical solution, it can obtain the process information in the game process by comparing the preset feature image and the comparison image in real time. Therefore, the efficiency of obtaining game process information may be greatly improved and a probability of obtaining incorrect information may be reduced because human errors in the existing technology are reduced.

According to an embodiment, the game process information may include a start and an end of a game, fighting information and equipment information in the game process. In the foregoing example, obtaining of the equipment information is further described. For the start and the end of the game, obtaining of the fighting information in the game process is similar to that of the equipment information, and only a corresponding feature image need to be set.

Specifically, a technical solution of obtaining game process-related information from a game video live streaming content screenshot by using an intelligent image identification technology is provided. For example, obtaining a game outfit equipment screenshot is only one of the technical solutions of this application. More game process information may further be obtained according to the embodiments herein. For example, a feature image may be set at a start or an end of a game, and an event and a time of the start and a time of the end of the game may be obtained. If the feature image is replaced with fighting information in the game, for example, a feature image of killing by a player, a killing event and time and the like may be obtained.

It should be noted that, the foregoing embodiments are expressed as a series of actions. However, persons skilled in the art would understand that the present disclosure is not limited to the sequence described herein, because according to the present disclosure, some steps may be performed in other sequences or performed simultaneously. In addition, persons skilled in the art would also understand that the embodiments described herein all belong to exemplary embodiments, and the involved actions and modules are not necessarily mandatory to the present disclosure.

To better implement the foregoing solutions of the embodiments, related apparatuses used to implement the foregoing solutions are further provided.

According to an embodiment, referring to FIG. 5-a, an image processing apparatus 500 may include at least one memory, and at least one processor. The at least one memory stores at least one instruction module, configured to be executed by the at least one processor. The at least one instruction module may include a feature obtaining module 501, a video screenshot module 502, a feature detection module 503, and an image output module 504.

Figure 5A:
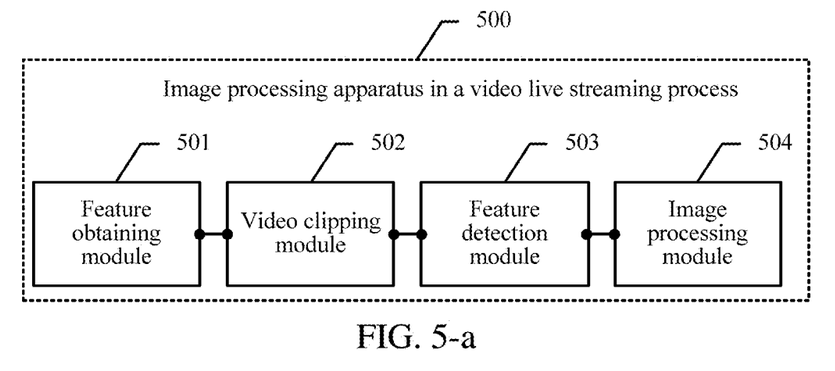

The feature obtaining module 501 may be configured to obtain a feature image preset for a service process, the feature image being an image block that can identify the service process.

The video screenshot module 502 may be configured to obtain a video screenshot from a video live streaming data stream according to a screenshot interval.

The feature detection module 503 may be configured to detect whether the feature image exists in the video screenshot.

The image output module 504 may be configured to output the video screenshot if the feature image is detected in the video screenshot.

According to an embodiment, referring to FIG. 5-b, the feature obtaining module 501 may include a sample obtaining module 5011 configured to obtain a sample screenshot corresponding to the service process, a feature locating module 5012 configured to obtain, from the sample screenshot, the feature image preset for the service process, the feature image including a first location coordinate and first length and width information. That is, the feature locating module 5012 may obtain, from the sample screenshot, the feature image preset for the service process and first attribute information corresponding to the feature image, the first attribute information including the first location coordinate and the first length and width information, and the first location coordinate being a location coordinate of the feature image in the sample screenshot, and the first length and width information being length and width information of the feature image. The feature obtaining module 501 may also include a content locating module 5013 configured to obtain sample content image from the sample screenshot, the sample content image including a second location coordinate and second length and width information. That is, the content locating module 5013 being configured to obtain, from the sample screenshot, second attribute information corresponding to the sample content image, the second attribute information including the second location coordinate and the second length and width information. The sample content image being an image block that is in the sample screenshot and that displays process information of the service process, the second location coordinate being a location coordinate of the sample content image in the sample screenshot, and the second length and width information being length and width information of the sample content image.

According to an embodiment, referring to FIG. 5-c, the feature detection module 503 may include a comparison image cutting module 5031 configured to obtain a comparison image in the video screenshot according to the first location coordinate and the first length and width information, a location coordinate of the comparison image in the video screenshot being the first location coordinate, and length and width information of the comparison image in the video screenshot being the first length and width information, and an image comparison module 5032 configured to determine whether the comparison image and the feature image are the same through image comparison, and if the comparison image and the feature image are the same, determine that the feature image is detected in the captured video image, or if the comparison image and the feature image are different, determine that the feature image is not detected in the captured video image.

In some embodiments, the image output module 504 may be specifically configured to cut a process content image corresponding to the service process, in the video screenshot according to the second location coordinate and the second length and width information, and output the process content image.

Figure 5B:
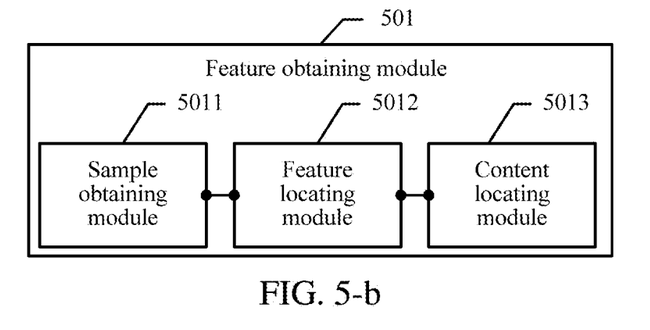

In some embodiments, the sample obtaining module 5011 may specifically configured to obtain, from a video live streaming window, the sample screenshot corresponding to the service process.

In some embodiments, referring to FIG. 5-d, the image processing apparatus 500 in a video live streaming process may further include an information obtaining module 505 configured to obtain, from the video screenshot, process information corresponding to the service process after the image output module 504 outputs the video screenshot, and a display module 506 configured to display, in a video live streaming window, the process information corresponding to the service process.

Figure 5C:
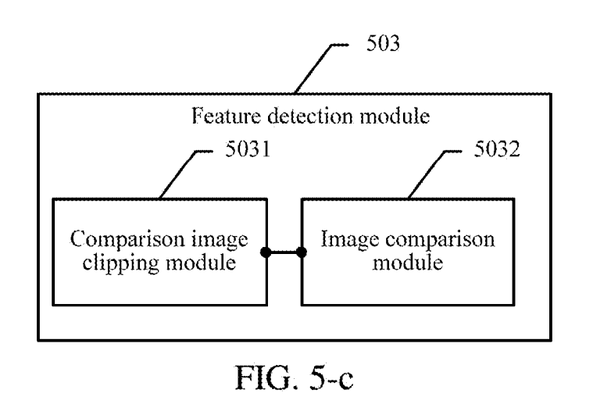
Figure 5D:
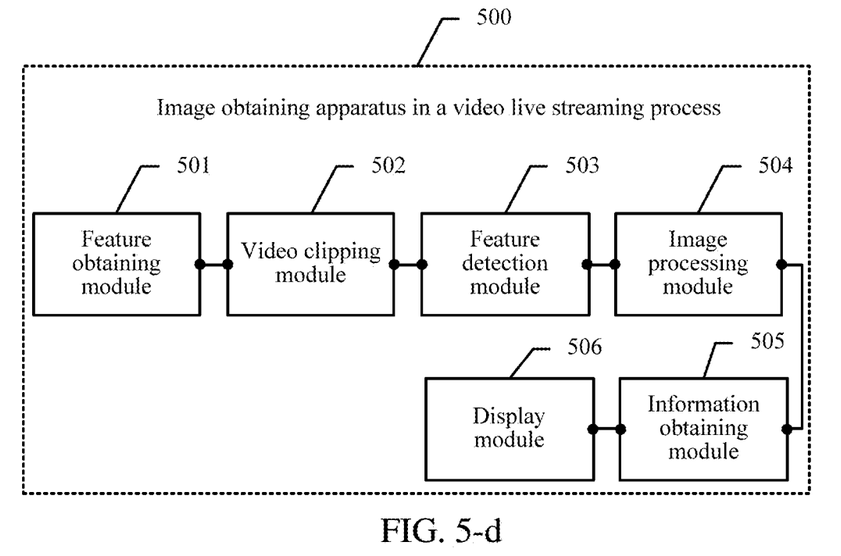

In some embodiments, the display module 506 may be specifically configured to receive a process invoking instruction delivered by a user, and display the process information corresponding to the service process, in the video live streaming window according to the process invoking instruction.

In some embodiments, the feature detection module 503 may be further configured to, when the feature image is not detected in the video screenshot and the screenshot interval reaches a next screenshot moment, execute the video screenshot module.

It can be learned from the description of this embodiment that, the feature image preset for the service process may be obtained, and the video screenshot may be obtained from the video live streaming data stream according to the screenshot interval. Also, the video streaming apparatus may detect whether the feature image exists in the video screenshot, and the video screenshot may be output when the feature image is detected in the video screenshot.

According to an embodiment, the video screenshot may be obtained by extracting the video live streaming data stream in real time, image recognition may be performed in the video screenshot, and the video screenshot may be output when the feature image of the service process is detected in the video screenshot. A video screenshot including a feature image may be obtained precisely, rapidly, and continuously by using an image recognition technology. Thus, the operational staff do not need to pay attention to the video live streaming process in real time. Accordingly, the workload of the operational staff is greatly reduced. An automated image extraction may be implemented in the video live streaming process through an image comparison so that a manual extraction process of the process information may be avoided, and errors and report delays may be reduced.

Figure 6:
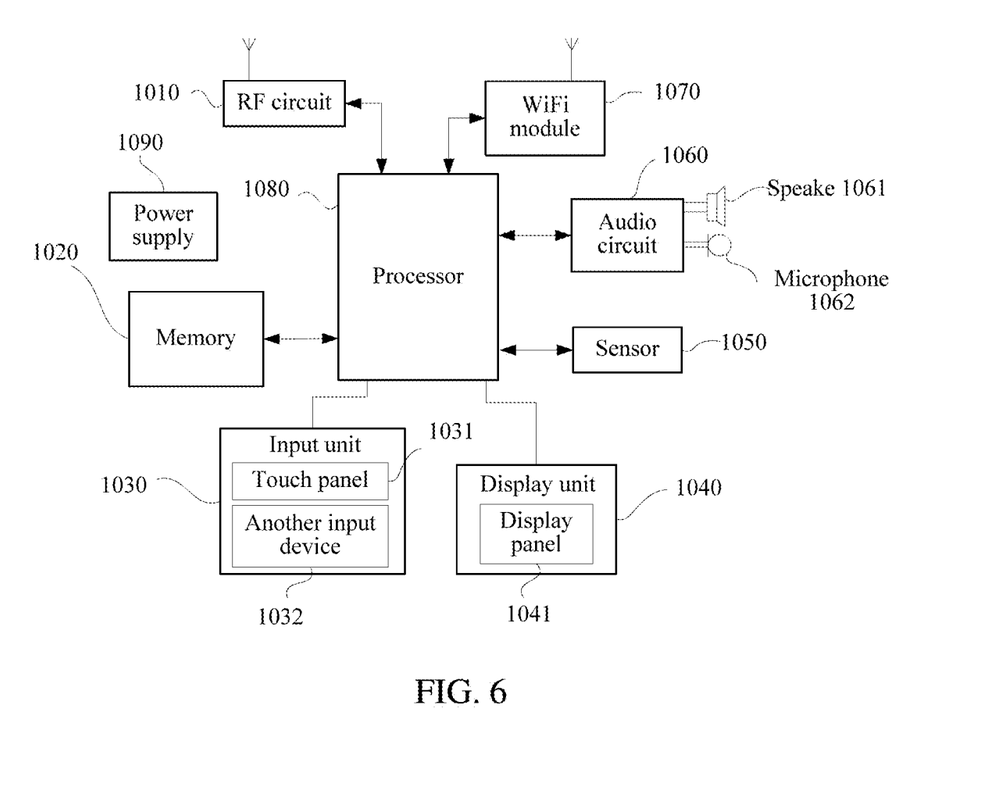
FIG. 6 is a composition schematic diagram of a terminal to which an image processing method in a video live streaming process is applied according to an embodiment.

FIG. 6 is a composition schematic diagram of a terminal to which an image processing method in a video live streaming process is applied according to an embodiment. Here, the terminal may be any terminal device, including a mobile phone, a tablet computer, a personal digital assistant (PDA), a point of sales (POS), and an in-vehicle computer. For example, the terminal is a mobile phone.

For example, FIG. 6 may be a part of structure of a mobile phone related to the terminal provided in this embodiment. Referring to FIG. 6, the mobile phone includes components, such as a radio frequency (RF) circuit 1010, a memory 1020, an input unit 1030, a display unit 1040, a sensor 1050, an audio circuit 1060, a wireless fidelity (WiFi) module 1070, a processor 1080, and a power supply 1090. Persons skilled in the art may understand that the structure of the mobile phone shown in FIG. 6 is not limited to the mobile phone, and the mobile phone may include more components or fewer components than those shown in the figure, or some components may be combined, or a different component deployment may be used.

Specifically, the RF circuit 1010 may be configured to receive and send signals during an information receiving and sending process or a call process. The RF circuit 1010 receives downlink information from a base station, then delivers the downlink information to the processor 1080 for processing, and sends designed uplink data to the base station. The RF circuit 1010 includes, but is not limited to, an antenna, at least one amplifier, a transceiver, a coupler, a low noise amplifier (LNA), and a duplexer. In addition, the RF circuit 1010 may also communicate with a network and another device through wireless communication. The wireless communication may use any communication standard or protocol, including, but not limited to, Global System for Mobile communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 1020 may be configured to store a software program and module. The processor 1080 runs the software program and module stored in the memory 1020, to implement various functional applications and data processing of the mobile phone. The memory 1020 may mainly include a program storage area and a data storage area. The program storage area may store an operating system, an application program required by at least one function, such as a sound playback function and an image display function, and the like. The data storage area may store data, such as audio data and an address book, may be created according to the use of the mobile phone, and the like. In addition, the memory 1020 may include a high-speed random access memory, and may further include a non-volatile memory, such as at least one magnetic disk storage device or a flash memory device, or another volatile solid storage device.

The input unit 1030 may be configured to receive input digit or character information, and generate a keyboard signal input related to the user setting and function control of the mobile phone. Specifically, the input unit 1030 may include a touch panel 1031 and another input device 1032. The touch panel 1031, also referred to as a touchscreen, may collect a touch operation of a user on or near the touch panel, such as an operation of a user on or near the touch panel 1031 by using any suitable object or accessory such as a finger or a stylus, and drive a corresponding connection apparatus according to a preset program. Additionally, the touch panel 1031 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 1080. In addition, the touch controller may receive a command sent by the processor 1080 and execute the command. In addition, the touch panel 1031 may be a resistive, capacitive, infrared, or surface sound wave type touch panel. In addition to the touch panel 1031, the input unit 1030 may further include the another input device 1032. Specifically, the another input device 1032 may include, but is not limited to, one or more of a physical keyboard, a functional key, such as a volume control key or a switch key, a track ball, a mouse, and a joystick.

The display unit 1040 may be configured to display information input by the user or information provided for the user, and various menus of the mobile phone. The display unit 1040 may include a display panel 1041. In addition, the display panel 1041 may be configured by using a liquid crystal display (LCD), an organic light-emitting diode (OLED), or the like. Further, the touch panel 1031 may cover the display panel 1041. After detecting a touch operation on or near the touch panel 1031, the touch panel 1031 transfers the touch operation to the processor 1080, to determine a type of a touch event. Then, the processor 1080 provides a corresponding visual output on the display panel 1041 according to the type of the touch event. Although in FIG. 6, the touch panel 1031 and the display panel 1041 are used as two separate parts to implement input and output functions of the mobile phone, in some embodiments, the touch panel 1031 and the display panel 1041 may be integrated to implement the input and output functions of the mobile phone.

The mobile phone may further include at least one sensor 1050, such as an optical sensor, a motion sensor, and other sensors. Specifically, the optical sensor may include an ambient light sensor and a proximity sensor. The ambient light sensor may adjust luminance of the display panel 1041 according to brightness of the ambient light. The proximity sensor may switch off the display panel 1041 and/or backlight when the mobile phone is moved to the ear. As one type of motion sensor, an acceleration sensor may detect magnitude of accelerations in various directions, may detect magnitude and a direction of the gravity when static, and may be applied to an application that recognizes the attitude of the mobile phone, For example, switching between landscape orientation and portrait orientation, a related game, and magnetometer attitude calibration, and a function related to vibration recognition, such as a pedometer and a knock, and the like. Other sensors, such as a gyroscope, a barometer, a hygrometer, a thermometer, and an infrared sensor, which may be configured in the mobile phone, are not further described herein.

The audio circuit 1060, a speaker 1061, and a microphone 1062 may provide audio interfaces between the user and the mobile phone. The audio circuit 1060 may convert received audio data into an electrical signal and transmit the electrical signal to the speaker 1061. The speaker 1061 converts the electrical signal into a sound signal for output. On the other hand, the microphone 1062 converts a collected sound signal into an electrical signal. The audio circuit 1060 receives the electrical signal, converts the electrical signal into audio data, and outputs the audio data to the processor 1080 for processing. Then, the processor 1080 sends the audio data to, for example, another mobile phone by using the RF circuit 1010, or outputs the audio data to the memory 1020 for further processing.

Wi-Fi belongs to a short distance wireless transmission technology. The mobile phone may help, by using the Wi-Fi module 1070, a user to receive and send an email, browse a web page, access stream media, and the like. This provides wireless broadband Internet access for the user. Although FIG. 6 shows the Wi-Fi module 1070, it may be understood that the Wi-Fi module 1070 may not be implemented on the mobile phone, and the WiFi module 1070 may be omitted as required provided that the scope of the essence of the present disclosure is not changed.

The processor 1080 is a control center of the mobile phone, and is connected to various parts of the entire mobile phone by using various interfaces and lines. By running or executing a software program and/or module stored in the memory 1020, and invoking data stored in the memory 1020, the processor 1080 executes various functions of the mobile phone and performs data processing, thereby monitoring the entire mobile phone. In addition, the processor 1080 may include one or more processing units. Preferably, the processor 1080 may integrate an application processor and a modem processor. The application processor mainly processes an operating system, a user interface, an application program, and the like. The modem processor mainly processes wireless communication. It may be understood that the foregoing modem processor may alternatively not be integrated into the processor 1080.

The mobile phone may further include the power supply 1090, such as a battery, for supplying power to the components. Preferably, the power supply may be logically connected to the processor 1080 by using a power management system, thereby implementing functions, such as charging, discharging, and power consumption management by using the power management system.

The mobile phone may further include a camera, a Bluetooth module, and the like, which are not further described herein.

In the foregoing embodiments, the mobile phone includes a processor 1080, and a memory 1020. The processor 1080 and the memory 1020 communicate with each other by using a bus.

The memory 1020 may be configured to store a program, an instruction, and data.

The processor 1080 may be configured to perform the method in the embodiment of FIG. 1 by invoking the program, the instruction, and the data in the memory 1020. For example, the processor 1080 included in the terminal further may control performing of the image processing method in a video live streaming process, performed by the terminal.

It can be learned from the description of this embodiments that, the feature image preset for the service process may be obtained, and the video screenshot may be obtained from the video live streaming data stream according to the screenshot interval. The terminal may detect whether the feature image exists in the video screenshot, and the video screenshot may be output when the feature image is detected in the video screenshot. According to an embodiment, the video screenshot may be obtained by extracting the video live streaming data stream in real time, and the video screenshot may be output when the feature image of the service process is detected in the video screenshot. A video screenshot including a feature image may be obtained precisely, rapidly, and continuously by using an image recognition technology. Thus, the operational staff do not need to pay attention to the video live streaming process in real time, and the workload of the operational staff may be greatly reduced. An automated image extraction may be implemented in the video live streaming process through an image comparison, so that a manual extraction process of the process information may be avoided, and errors and report delay of the process information may be reduced.

In addition, it should be noted that the described apparatus embodiment is merely exemplary. The units described as separate parts may or may not be physically separated, and parts displayed as units may or may not be physical units, may be located in one position, or may be distributed on a plurality of network units. Some or all modules thereof may be selected based on an actual requirement, to implement an objective of the solution in this embodiment. In addition, in the accompanying drawings of the apparatus embodiments provided by the present disclosure, connection relationships between modules indicate that the modules have communication connections with each other, which may be specifically implemented as one or more communications buses or signal cables. Persons of ordinary skill in the art may understand and implement the objective without creative efforts.

Based on the descriptions of the foregoing implementations, persons skilled in the art may understand that the embodiment of the present disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve the same function may be of various forms, for example, in a form of an analog circuit, a digital circuit, or a dedicated circuit. However, as for the present disclosure, software program implementation is a better implementation in most cases. Based on such an understanding, the technical solutions of the present disclosure essentially or the part contributing to the existing technology may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device, which may be a personal computer, a server, a network device, and the like, to perform the methods described in the embodiments of the present disclosure. Therefore, an embodiment of the present disclosure further provides a computer readable storage medium, including an instruction, and when the instruction is run on a computer, causing the computer to perform the image processing method in a video live streaming process.

In conclusion, the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof. These modifications or replacements do not make the essence of corresponding technical solution depart from the spirit and scope of the technical solutions of the embodiments of the present disclosure.

What is claimed is:

1. An image processing method of a video live streaming process, the method comprising:
   obtaining a feature image preset for a gaming process, the feature image being an image block representing one or more attributes of the gaming process, the gaming process including a start and an end of a game;
   obtaining a video screenshot from a video live streaming data stream according to a screenshot interval;
   detecting whether the feature image exists in the video screenshot; and
   outputting the video screenshot based on the feature image being detected in the video screenshot.

2. The method according to claim 1, wherein the obtaining the feature image preset for the gaming process comprises:
   obtaining a sample screenshot corresponding to the gaming process;
   obtaining, from the sample screenshot, the feature image preset for the gaming process and first attribute information corresponding to the feature image, the first attribute information comprising a first location coordinate of the feature image, and first length and width information,
      the first location coordinate of the feature image being a location coordinate of the feature image in the sample screenshot, and the first length and width information including a first length and a first width of the feature image; and
   obtaining, from the sample screenshot, second attribute information corresponding to a sample content image, the second attribute information comprising a second location coordinate, second length and width information, the sample content image being an image block; in the sample screenshot, and displaying process information of the gaming process,
      the second location coordinate being a location coordinate of the sample content image in the sample screenshot, and the second length and width information including a second length and a second width of the sample content image.

3. The method according to claim 2, wherein the detecting whether the feature image exists in the video screenshot comprises:
   obtaining a comparison image in the video screenshot according to the first location coordinate and the first length and width information, a location coordinate of the comparison image in the video screenshot being the first location coordinate, and length and width information of the comparison image in the video screenshot being the first length and width; and
   determining whether the comparison image and the feature image are the same based on an image comparison, and if the comparison image and the feature image are the same, determining that the feature image is detected in the video screenshot, or if the comparison image and the feature image are not the same, determining that the feature image is not detected in the video screenshot.

4. The method according to claim 2, wherein the outputting the video screenshot comprises:
   obtaining a process content image corresponding to the gaming process, in the video screenshot according to the second location coordinate and the second length and width information; and
   outputting the process content image.

5. The method according to claim 2, wherein the obtaining the sample screenshot corresponding to the gaming process comprises:
   obtaining, from a video live streaming window, the sample screenshot corresponding to the gaming process.

6. The method according to claim 1, wherein, after the outputting the video screenshot, the method further comprises:
   obtaining, from the video screenshot, process information corresponding to the gaming process; and
   displaying, in a video live streaming window, the process information corresponding to the gaming process.

7. The method according to claim 6, wherein the displaying, in the video live streaming window, the process information corresponding to the gaming process comprises:
   receiving a process invoking instruction input by a user; and
   displaying the process information corresponding to the gaming process, in the video live streaming window according to the process invoking instruction.

8. The method according to claim 1, wherein the method further comprises:
   if the feature image is not detected in the video screenshot and the screenshot interval reaches a next screenshot moment, obtaining another video screenshot from the video live streaming data stream according to the screenshot interval.

9. An image processing apparatus of a video live streaming process, comprising:
   at least one memory configured to store computer program code; and
   at least one processor configured to access the computer program code comprising:
   feature obtaining code configured to cause the at least one processor to obtain a feature image preset for a gaming process, the feature image being an image block representing one or more attributes of the gaming process, the gaming process including a start and an end of a game;
   video screenshot code configured to cause the at least one processor to obtain a video screenshot from a video live streaming data stream according to a screenshot interval;
   feature detection code configured to cause the at least one processor to detect whether the feature image exists in the video screenshot; and
   image output code configured to cause the at least one processor to output the video screenshot based on the feature image being detected in the video screenshot.

10. The apparatus according to claim 9, wherein the feature obtaining code further comprises:
    sample obtaining code configured to cause the at least one processor to obtain a sample screenshot corresponding to the gaming process;

feature locating code configured to cause the at least one processor to obtain, from the sample screenshot, the feature image preset for the gaming process and first attribute information corresponding to the feature image, the first attribute information comprising a first location coordinate of the feature image, and first length and width information, the first location coordinate of the feature image being a location coordinate of the feature image in the sample screenshot, and the first length and width information including a first length and a first width of the feature image; and content locating code configured to cause the at least one processor to obtain, from the sample screenshot, second attribute information corresponding to a sample content image, the second attribute information comprising a second location coordinate, and second length and width information, the sample content image being an image block, in the sample screenshot, displaying process information of the gaming process, and the second location coordinate being a location coordinate of the sample content image in the sample screenshot, and the second length and width information including a second length and a second width of the sample content image.

11. The apparatus according to claim 10, wherein the feature detection code further comprises:

comparison image cutting code configured to cause the at least one processor to obtain a comparison image in the video screenshot according to the first location coordinate and the first length and width information, a location coordinate of the comparison image in the video screenshot being the first location coordinate, and length and width information of the comparison image in the video screenshot being the first length and width; and image comparison code configured to cause the at least one processor to determine whether the comparison image and the feature image are the same based on an image comparison, and if the comparison image and the feature image are the same, determine that the feature image is detected in the captured video image, or if the comparison image and the feature image are not the same, determine that the feature image is not detected in the captured video image.

12. The apparatus according to claim 10, wherein the image output code is further configured to cause the at least one processor to:

obtain a process content image corresponding to the gaming process, in the video screenshot according to the second location coordinate and the second length and width information; and output the process content image.

13. The apparatus according to claim 10, wherein the sample obtaining code is further configured to cause the at least one processor to obtain, from a video live streaming window, the sample screenshot corresponding to the gaming process.

14. The apparatus according to claim 9, wherein the image processing apparatus in the video live streaming process further comprises:

information obtaining code configured to cause the at least one processor to obtain, from the video screenshot, process information corresponding to the gaming process, after the image output code outputs the video screenshot; and display code configured to cause the at least one processor to display, in a video live streaming window, the process information corresponding to the gaming process.

15. The apparatus according to claim 14, wherein the display code is further configured to cause the at least one processor to:

receive a process invoking instruction input by a user; and display the process information corresponding to the gaming process, in the video live streaming window according to the process invoking instruction.

16. The apparatus according to claim 9, wherein the feature detection code is further configured to cause the at least one processor to, when the feature image is not detected in the video screenshot and the screenshot interval reaches a next screenshot moment, execute the video screenshot code.

17. A non-transitory computer readable storage medium, storing executable instructions, the executable instructions capable of causing a computer to perform the method according to claim 1.

18. An image processing method of a video live streaming process, performed by a terminal device, the method comprising:

obtaining a feature image preset for a gaming process, the feature image being an image block representing one or more attributes of the gaming process, the gaming process including a start and an end of a game;

obtaining a video screenshot from a video live streaming data stream according to a screenshot interval;

detecting whether the feature image exists in the video screenshot; and outputting the video screenshot based on the feature image being detected in the video screenshot.

19. The image processing method according to claim 18, wherein the obtaining the feature image preset for the gaming process comprises:

obtaining a sample screenshot corresponding to the gaming process;

obtaining, from the sample screenshot, the feature image preset for the gaming process and first attribute information corresponding to the feature image, the first attribute information comprising a first location coordinate of the feature image and first length and width information, and the first location coordinate of the feature image being a location coordinate of the feature image in the sample screenshot, and the first length and width information including a first length and a first width of the feature image; and obtaining, from the sample screenshot, second attribute information corresponding to a sample content image, the second attribute information comprising a second location coordinate and second length and width information, the sample content image being an image block, in the sample screenshot, displaying process information of the gaming process, and the second location coordinate being a location coordinate of the sample content image in the sample screenshot, and the second length and width information including a second length and a second width of the sample content image.

20. A non-transitory computer readable storage medium, storing executable instructions, the executable instructions capable of causing a computer to perform the method according to claim 18.

* * * * *